May 2, 1950 C. O. BADGETT 2,506,330
SAFETY SIGNAL FOR MOTOR VEHICLES
Filed Aug. 9, 1949 2 Sheets-Sheet 1
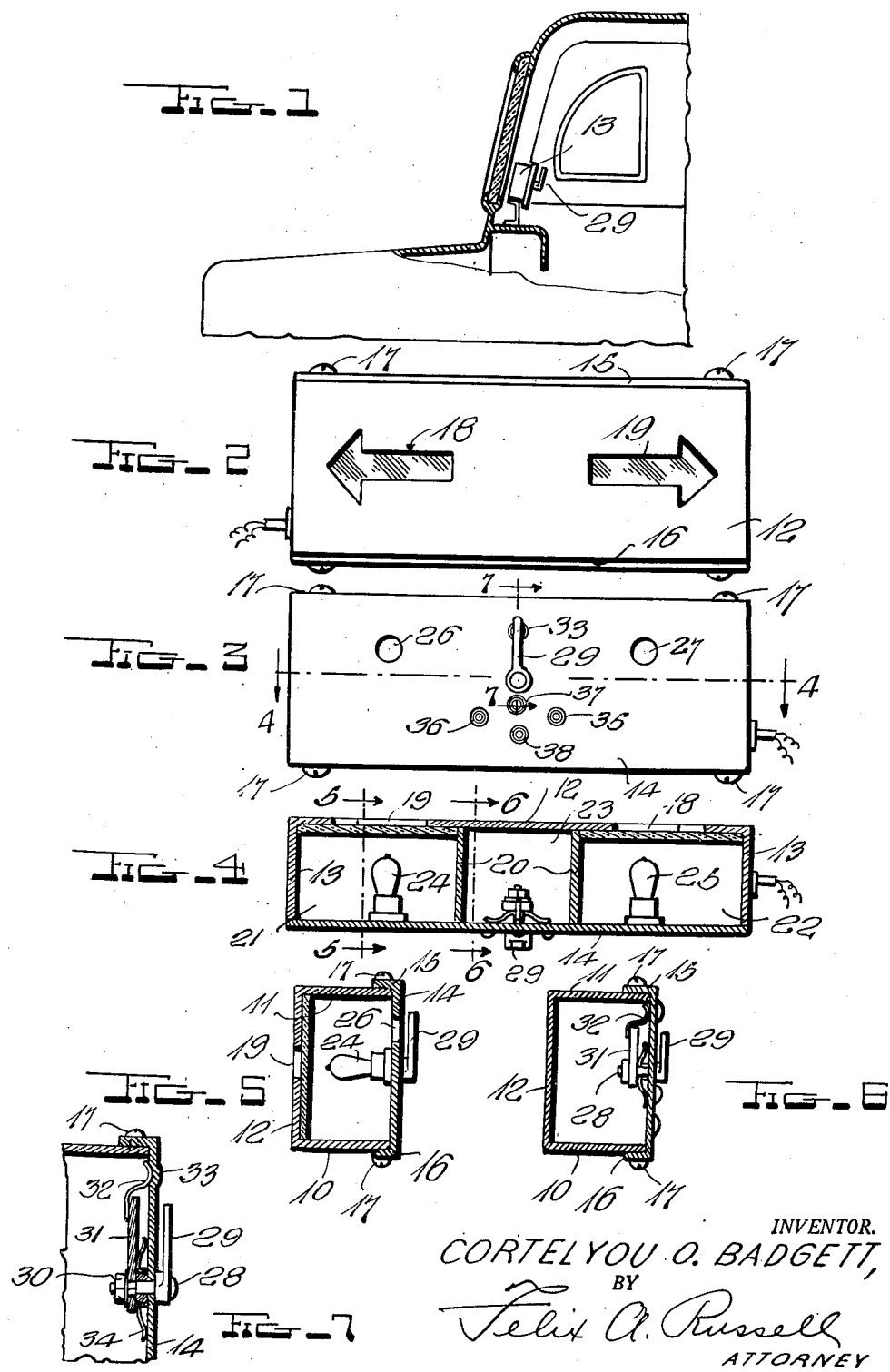
INVENTOR.
CORTELYOU O. BADGETT,
BY
Felix A. Russell
ATTORNEY May 2, 1950 C. O. BADGETT 2,506,330
SAFETY SIGNAL FOR MOTOR VEHICLES
Filed Aug. 9, 1949 2 Sheets-Sheet 2
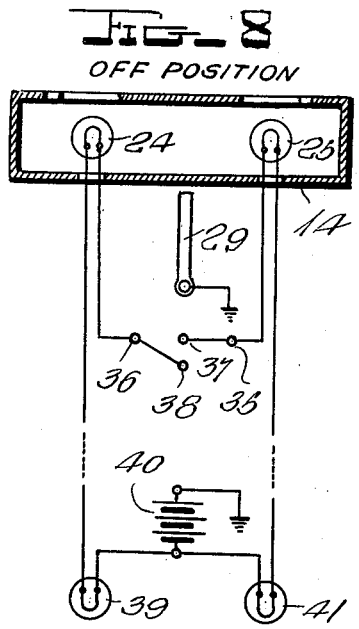
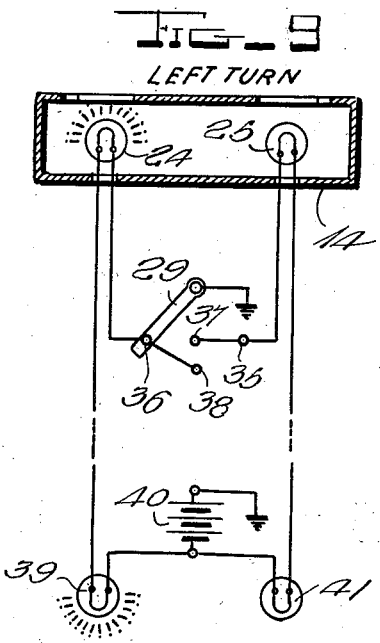
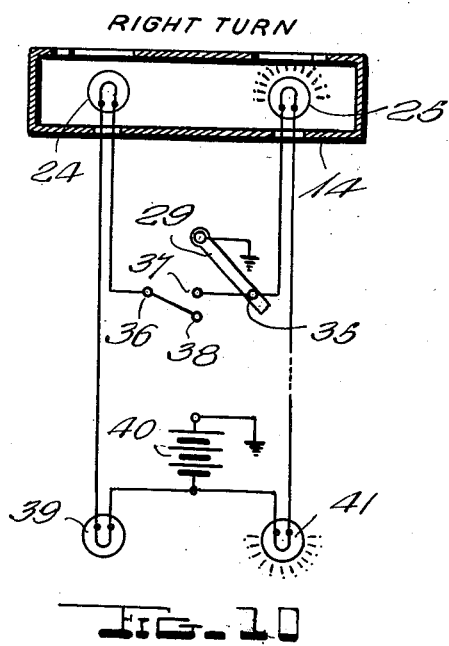
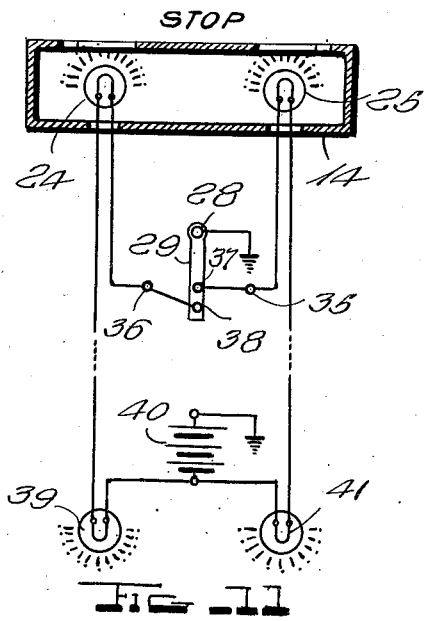
INVENTOR.
CORTELYOU O. BADGETT,
BY
*Felix A. Russell*
ATTORNEY Patented May 2, 1950

2,506,330

UNITED STATES PATENT OFFICE 2,506,330

SAFETY SIGNAL FOR MOTOR VEHICLES

Cortelyou O. Badgett, Yanceyville, N. C.

Application August 9, 1949, Serial No. 109,284

1 Claim. (Cl. 177—329)

The present invention relates to a safety signal for motor vehicles and it consists in the combinations, constructions and arrangements of parts herein described and claimed.

Generally there is provided a safety signal for motor vehicles comprising a housing adapted to be mounted in a vehicle immediately to the rear of the windshield and having a pair of arrow-shaped windows in the front wall thereof and a compartment within the housing behind each of the windows. A lamp is mounted in each of the compartments and the rear wall of the housing is provided with a selective switch whereby the operator of the vehicle may selectively light one of the lamps to advise oncoming traffic of intended turns to the right or left. An electrical system is included as a part of the invention and provides means whereby the conventional left and right rear signals of a vehicle may be simultaneously controlled with the lamps in the housing. Means is also provided in the switch whereby both of the conventional rear signals and both of the signal lamps within the housing may be turned on simultaneously to indicate an intended stop by the vehicle provided with the present invention.

It is accordingly an object of the invention to provide a device of the character set forth which is simple in construction, inexpensive to manufacture and yet effective and efficient in use.

Another object of the invention is the provision of a device of the character set forth having a novel switch forming a part of the invention.

Another object of the invention is the provision of a novel electrical system forming a part of the invention.

Other and further objects of the invention will become apparent from a reading of the following specification taken in conjunction with the drawings, in which:

Figure 1 is a side elevational view of an embodiment of the invention illustrating how the same may be mounted in a motor vehicle, Figure 2 is a front elevational view of the device forming the present invention, Figure 3 is a rear elevational view thereof, Figure 4 is a sectional view taken along line 4—4 of Figure 3, Figure 5 is a sectional view taken along line 5—5 of Figure 4, Figure 6 is a sectional view taken along line 6—6 of Figure 4, Figure 7 is an enlarged fragmentary view taken along line 7—7 of Figure 3, and Figures 8 to 11, inclusive, are schematic views illustrating the various positions of a switch forming a part of the invention.

Referring more particularly to the drawings, there is shown therein a housing having a bottom 10, a top 11 and a front wall 12 together with end walls 13. A rear cover plate 14 is provided with a forwardly extending upper flange 15 and a forwardly extending lower flange 16 which flanges are adapted to be fastened to the top and bottom of the housing by means of screws 17 or the like.

The front wall 12 has cut therein an arrow-shaped window 18 which points to the left as viewed from the front thereof and which is adapted to indicate a right turn. A like arrow-shaped window 19 is also provided in the front wall 12 but points in the opposite direction and is adapted to indicate a left turn by the vehicle in which the present invention is incorporated.

Adjacent the center of the housing there is provided a pair of spaced transversely extending walls 20 which serve to divide the interior of the housing into a pair of lamp compartments 21 and 22 and a switch compartment 23. A lamp 24 is mounted in the compartment 21 and a like lamp 25 is mounted in the compartment 22. Immediately above and adjacent the lamp 24 an opening 26 is provided in the wall 14 and an opening 27 is likewise provided immediately above the lamp 25.

Centrally positioned in the rear wall 14 is a revolubly mounted shaft 28 affixed to the outer end of which is a switch arm 29 and to the inner end of which is affixed by means of a nut 30, a latch arm 31 whose outer end is provided with a spring detent 32 which is adapted to fit within a recess 33 positioned directly above the shaft 28.

A ladder shaped spring 34 surrounds the shaft 28 and is interposed between the arm 31 and the inner face of the wall 14. A right contact member 35 and a left contact member 36 are positioned in the wall 14 to the right and left of a vertical line intersecting the shaft 28 and a pair of vertical contact members 37 and 38 are positioned immediately below the contact arm shaft 28.

In operation, it will be apparent that when the driver or operator of the vehicle in which the present device is incorporated desires to indicate to oncoming traffic as well as to following traffic that he desires to make a turn to the left, it is only necessary for him to move the contact arm 29 from its normal upright position as viewed, for example, in Figure 3 and Figure 8, to the position shown in Figure 9, that is to say in contact with the left contact member 36. This action will complete a circuit which includes the lamp 24 and the conventional rear left turn indicator lamp 39 together with a battery 40 or other source of electrical energy. When the driver wishes to indicate a right turn, he will move the contact arm 29 to the position shown in Figure 10 of the drawings. That is to say, the contact arm 29 will now be in contact with the right contact member 35 thus completing a circuit which includes the lamp 25 and a conventional rear right turn indicator 41 together with the source of electrical current 40.

When the operator of the vehicle wishes to indicate a stop, it is only necessary to bring the arm 29 to a downward vertical position, that is to say in contact with the vertical contact members 37 and 38 whereupon two complete electrical circuits are completed which circuits include the lamps 24 and 25 as well as the rear indicator lamps 39 and 41 together with the source of electrical current indicated at 40.

It will also be apparent that the operator of the vehicle may check upon the functioning of the circuits at all times by viewing the lamps 24 and 25 through the openings 26 and 27, respectively.

While but one form of the invention has been shown and described herein, it will be readily apparent to those skilled in the art that many minor modifications may be made without departing from the spirit of the invention or the scope of the appended claim.

What is claimed is:

An apparatus of the character described comprising, in combination, a housing adapted to be displayed through the windshield of a motor vehicle and having a compartment in each end thereof, an outwardly pointed arrow-shaped window in the forward wall of each compartment, a lamp in each compartment for respectively indicating left and right turns to oncoming traffic, conventional left and right indicator lamps for the rear of the vehicle, an electrical circuit including the forward and rearward left turn indicating lamps, an electrical circuit including the forward and rearward right turn indicating lamps, a common source of electrical power for said circuits and a switch having means for opening both circuits, selectively closing either circuit and for closing both of said circuits, said housing being formed of metal and provided with a top, bottom, sides, a forward wall, a rearward wall, a pair of partitions providing a lamp compartment in each end thereof and a switch compartment in the center thereof and wherein said switch is centrally disposed in the rearward wall.

CORTELYOU O. BADGETT.

REFERENCES CITED

The following references are of record in the file of this patent:

UNITED STATES PATENTS

| Number | Name | Date |
| --- | --- | --- |
| 1,856,519 | Spears | May 3, 1932 |
| 1,879,057 | Bray | Sept. 28, 1932 |
| 2,122,508 | Bell | July 5, 1938 |
| 2,188,451 | Bartens | Jan. 30, 1940 |